No. 879,409. PATENTED FEB. 18, 1908.
G. W. PIERCE.
WIRELESS TELEGRAPHY.
APPLICATION FILED MAR. 16, 1906.

2 SHEETS—SHEET 1.

Witnesses
Edward P. Stearns
Frank J. Duran

Inventor
George W. Pierce

UNITED STATES PATENT OFFICE.

GEORGE W. PIERCE, OF CAMBRIDGE, MASSACHUSETTS, ASSIGNOR TO MASSACHUSETTS WIRELESS EQUIPMENT COMPANY, A CORPORATION OF NEW YORK.

WIRELESS TELEGRAPHY.

No. 879,409.

Specification of Letters Patent.

Patented Feb. 18, 1908.

Application filed March 16, 1906. Serial No. 306,334.

*To all whom it may concern:*

Be it known that I, GEORGE W. PIERCE, a citizen of the United States, residing at Cambridge, in the county of Middlesex and the State of Massachusetts, have invented a new and useful Improvement in Wireless Telegraphy, of which the following is a full, clear, and exact description, reference being had to the accompanying drawings, which form a part of this specification.

The invention relates to wireless telegraphy, and more particularly to the receiving station of a wireless telegraph system.

The object of the invention is to provide apparatus at the receiving station of a wireless telegraph system which may be readily tuned or brought into resonance with electromagnetic waves of widely varying length and by which sharp resonance and intense signals or dull resonance may be secured under the various adjustments, and by which interference may be minimized.

The apparatus embodying the various features of the invention is accordingly provided with circuits and connections by which the operator may secure either sharp or dull resonance, or may cause the currents produced by undesired signals to be divided into two parts, the intensity and phase of which may be so adjusted that the two parts of the current will have the same intensity and opposite phase, thus neutralizing each other, while the divided currents caused by the desired signals are made to have approximately the same phase, and thus add in intensity.

The various features of the invention will be understood from an inspection of the accompanying drawings, and the following detail description of the apparatus illustrated therein.

Figure 1:
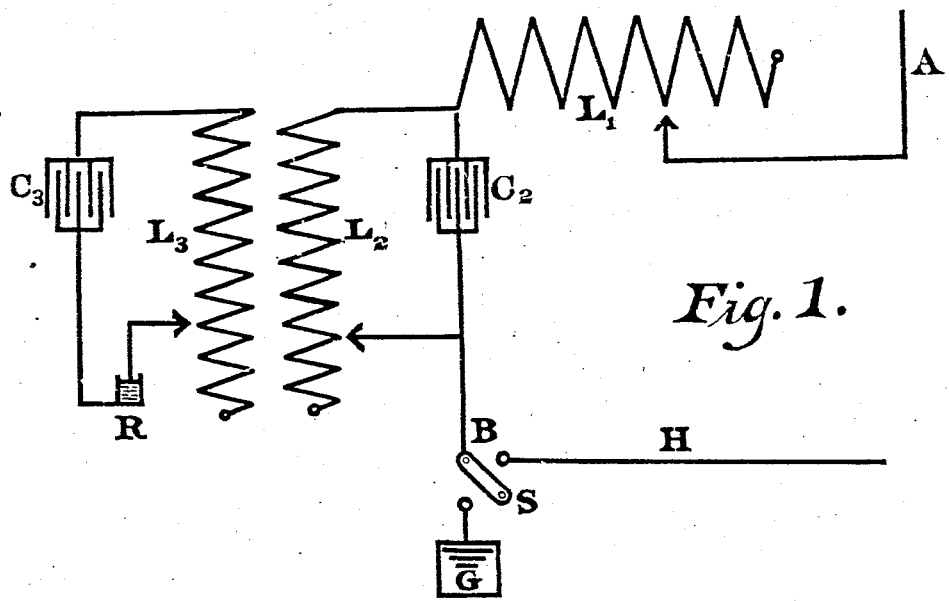
Figure 2:
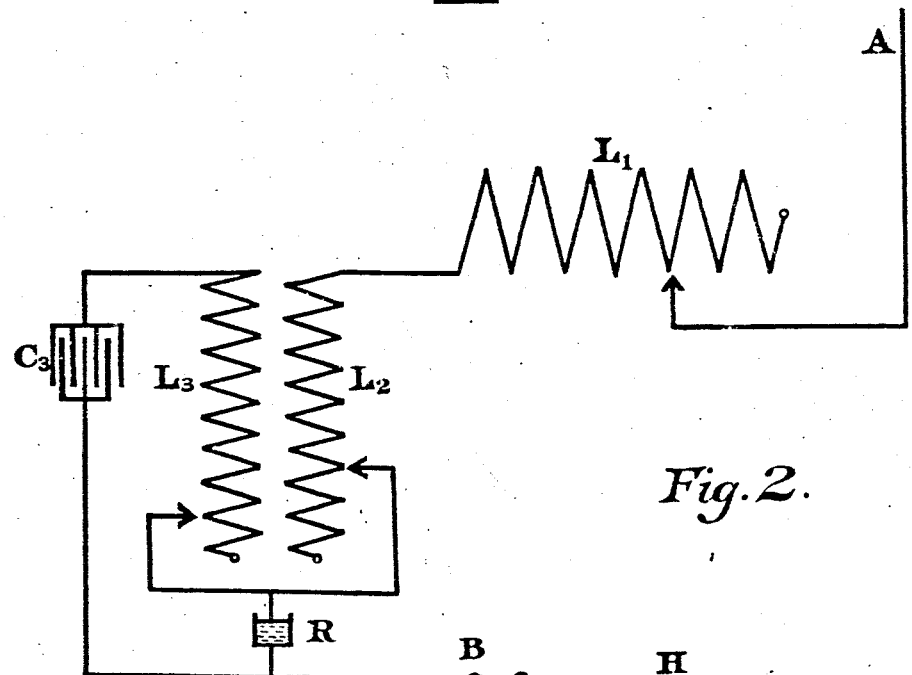

In the drawings Figure 1 is a diagrammatic view illustrating the arrangement of circuits when the proper connections are made for securing sharp resonance under normal conditions; Fig. 2 is a diagrammatic view illustrating the arrangement of circuits when the proper connections are made for dividing the currents into two parts when it is desired to eliminate interference due to unusual conditions; and Fig. 3 is a diagrammatic view showing an apparatus embodying the various features of the invention, and showing the connections by which the circuits of either Fig. 1 or Fig. 2, or a dully resonant circuit, may be secured at the will of the operator.

Figure 3:
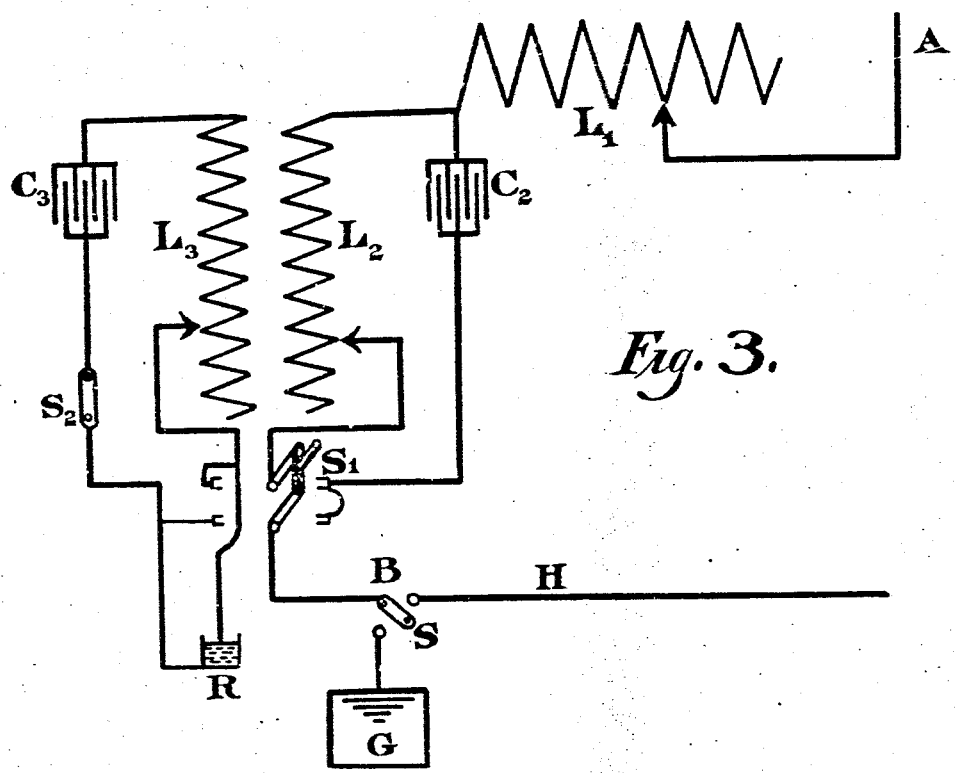

As indicated in Fig. 3 the wave detector circuit and the antenna circuits are inductively coupled by a high-frequency transformer, the coils $L_2$, $L_3$ of which are provided with sliding contacts by which the number of active turns in the respective coils may be varied or adjusted. The secondary coil $L_3$ is in circuit with a condenser $C_3$ the capacity of which may be varied and is also in circuit with a wave detector R which may be an electrolytic receiver or some other form of wave detector. One end of the primary coil $L^2$ is connected with the antenna A through an inductance coil $L_1$ which is provided with a sliding contact by which the number of active turns in the coil may be varied. The sliding contact of the primary coil $L_2$ is connected with one arm of a double switch $S_1$ the other arm of which is connected with a pivot B of a switch S. A condenser $C_2$, the capacity of which may be varied, is connected with the conductor between the coils $L_1$ $L_2$ and with one of the right hand contacts for the arms of the switch $S_1$ which contacts are electrically connected.

The arrangement of the circuits when the switch $S_1$ is in engagement with the right hand contacts is that indicated in Fig. 1. The antenna circuit is here connected through the switch S either with the earth at G or with the wire H which may terminate in an artificial capacity to be used instead of the earth connection or may lead off horizontally for a suitable distance and then connect to a wire leading to some point on the antenna. Either of these connections is what I term a "ground" connection.

By varying the number of active turns in the coils $L_2$ $L_2$ these coils may be given the values which are best suited to give sharp resonance and intensity of currents in the antenna circuit with the wave length to which it is desired to tune the apparatus and by varying the number of active turns in the coil $L_3$ and varying the capacity of the condenser $C_3$ if required, the stepping up (or stepping down) between the coils $L_2$ $L_3$ and the periodicity of the detector circuit may be secured which are best suited to the inducing of intense currents in the circuit of the wave detector R.

With the condenser $C^2$ in shunt about the primary coil $L_2$ and with the proper adjustments of $L_1$, $L_2$ and $C_2$ the low-resistance closed circuit including $C_2$ $L_2$ is set into persistent oscillation by the signals to which the apparatus is tuned and is not affected to a marked extent by signals of a different frequency. With the proper adjustment of $L_3$ and $C_3$ these oscillations induce intense oscillations in the circuit of the detector R. Also by varying $L_1$ $L_2$ at. 1 $C_2$ several combinations of adjustments each of which will give persistent oscillations in the closed circuit of $C_2$ and $L_2$, are possible and if one combination suffers from interference another may be found that is free from interference.

When it is desired to eliminate or minimize interference from a strong source of disturbance the switch $S_1$ is engaged with the contacts shown at the left in Fig. 3. This cuts out the condenser $C_2$ and connects the antenna and wave indicator circuits so that the currents in the primary circuit as well as the currents induced in the secondary circuit pass through the wave detector. This arrangement of circuits is illustrated in Fig. 2 and with the connections thus made such values may be given to the variable elements in the circuits that the currents produced by undesired signals will have such phase relations and intensities that the primary and induced currents will neutralize each other while the currents produced by the desired signal will have such phase relations as to add one to the other thus increasing the intensity of the currents sent through the detector by such signal.

Since the sharp resonance secured by the arrangement of circuits of Fig. 1 and Fig. 2 may result in the operator failing to get desired signals of which he does not know the periodicity in case his apparatus is slightly out of the proper adjustment for such signals, a switch $S_2$ is provided for opening the secondary circuit. With this switch open and switch $S_1$ in engagement with the contacts at the left in Fig. 3 only currents set up in the antenna circuit will pass through the wave detector. This will provide a circuit of comparatively dull resonance to be used when the operator is awaiting signals of which he does not know the periodicity.

It will be understood that I do not limit myself to the use of the particular form of circuits and connections shown and described, and that the specific form and arrangement of the parts may be varied as found desirable.

Having explained the nature and object of the invention, and described one form of apparatus in which the invention may be embodied, what I claim is:

1. In a receiving system for wireless telegraphy an inductive connection, a detector and a condenser connected with the secondary, and connections for sending the current set up in the primary of the inductive connection through the detector.

2. In a receiving system for wireless telegraphy, an inductive connection having a variable secondary, a detector and a condenser connected with the secondary, and connections for sending the currents set up in the primary of the inductive connection through the detector.

3. In a receiving system for wireless telegraphy, an inductive connection having a variable secondary, a detector and a condenser connected with the secondary, and connections for sending the currents set up in the primary of the inductive connection through the detector or directly to the ground.

4. In a receiving system for wireless telegraphy, an inductive connection having a variable secondary, a detector and a variable condenser connected with the secondary, and connections for sending the currents set up in the primary of the inductive connection through the detector.

5. In a receiving system for wireless telegraphy, an inductive connection having a variable primary and variable secondary, a detector and a condenser connected with the secondary, and connections for sending the currents set up in the primary of the inductive connection through the detector.

6. In a receiving system for wireless telegraphy, an inductive connection having a variable primary, a variable secondary, a detector and a condenser connected with the secondary, and connections for sending the currents set up in the primary of the inductive connection through the detector or directly to the ground.

7. In a receiving system for wireless telegraphy, an inductive connection, a wave detector connected with the secondary of the inductive connection, and means for disconnecting the secondary and wave detector and sending the currents set up in the primary through the detector.

8. In a receiving system for wireless telegraphy, an inductive connection with a variable primary, a wave detector connected with the secondary of the inductive connection and means for disconnecting the secondary and wave detector and sending the waves set up in the primary through the detector.

In witness whereof, I have hereunto set my hand, this 12th day of March, 1906.

GEORGE W. PIERCE.

In the presence of—
  IRA L. FISH,
  K. A. DUGAN.